United States Patent [19]

Lagrange et al.

[11] 4,447,855
[45] May 8, 1984

[54] DIELECTRIC CERAMIC COMPOSITION ON THE BASE OF THERMALLY STABLE BARIUM TITANATE AND CAPACITOR USING SUCH COMPOSITION

[75] Inventors: Alain Lagrange; Alain Rossello, both of Bagnolet, France

[73] Assignee: LCC. Cice-Compagnie Europeanne de Composants Electroniques, Bagnolet, France

[21] Appl. No.: 470,525

[22] Filed: Feb. 28, 1983

[30] Foreign Application Priority Data

Mar. 2, 1982 [FR] France ................ 82 03423

[51] Int. Cl.³ .................. H01G 1/01; H01G 3/135
[52] U.S. Cl. ........................ 361/321; 501/136
[58] Field of Search .......... 361/311, 312, 320, 321, 361/322; 501/10, 23, 134, 136, 137

[56] References Cited

U.S. PATENT DOCUMENTS 3,609,482  9/1971  Edelman et al. ............. 501/134 X
3,619,744 11/1971  Stephenson ................. 361/321
4,308,571 12/1981  Tanei et al. ................. 361/321

FOREIGN PATENT DOCUMENTS 2054653  5/1972  Fed. Rep. of Germany ...... 501/137
2132935  1/1973  Fed. Rep. of Germany .
2397374  2/1979  France .

OTHER PUBLICATIONS

Chem. Abst. vol. 85, #12, 20/9/76, Ref. 86236w.
Chem. Abst. vol. 85, #14, 4/10/76, 103039d.

Primary Examiner—Donald A. Griffin
Attorney, Agent, or Firm—Roland Plottel

[57] ABSTRACT

The invention relates to dielectric ceramic compositions on the base of barium titanate, allowing class BX capacitors to be used. According to the invention, the compositions are characterized in that they comprise from 80 to 94% by weight barium titanate, from 1 to 3% neodymium oxide, from 0 to 4% by weight bismuth oxide, from 2 to 5% by weight bismuth titanate and from 2 to 8% by weight glass frit.

12 Claims, 4 Drawing Figures

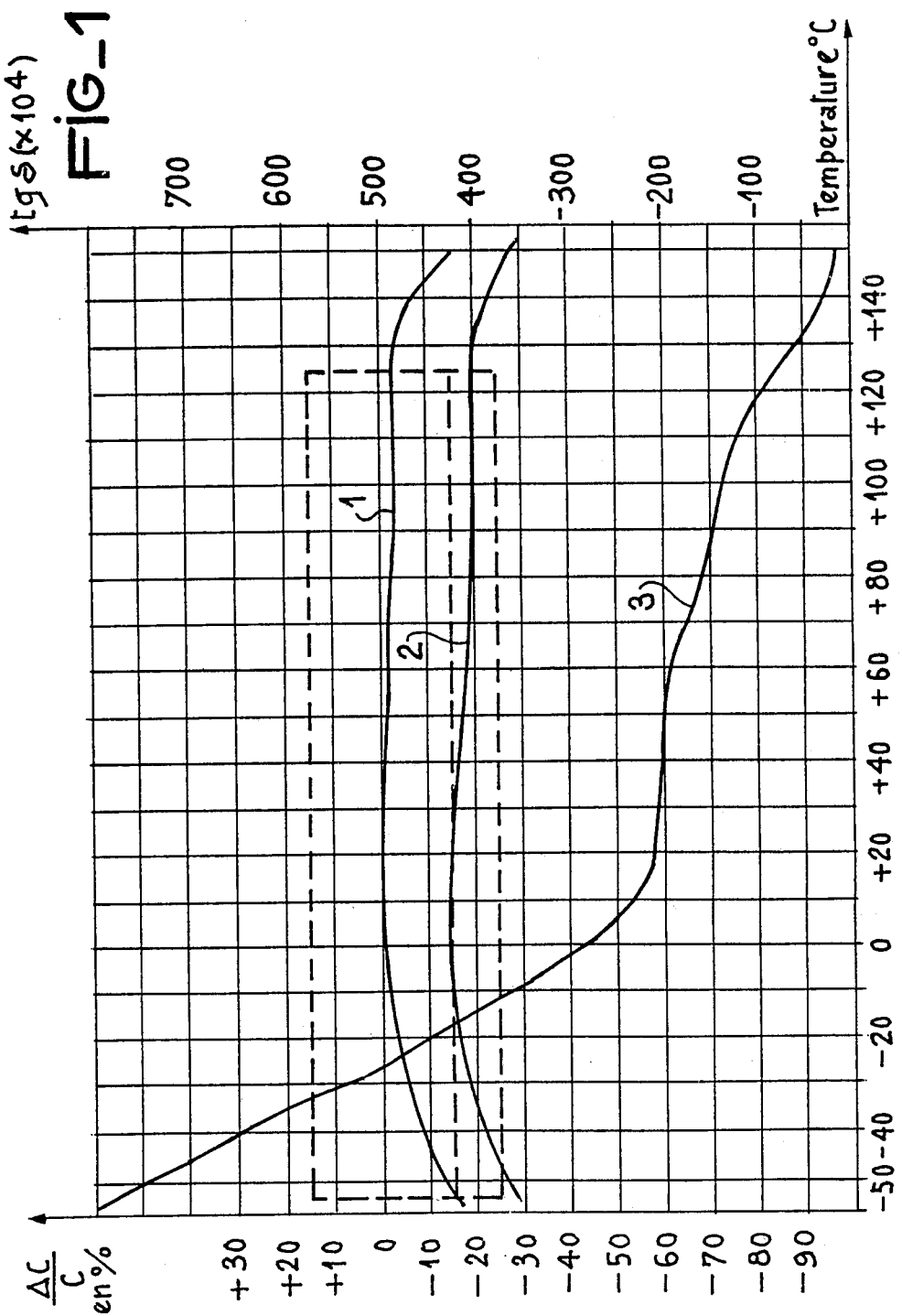

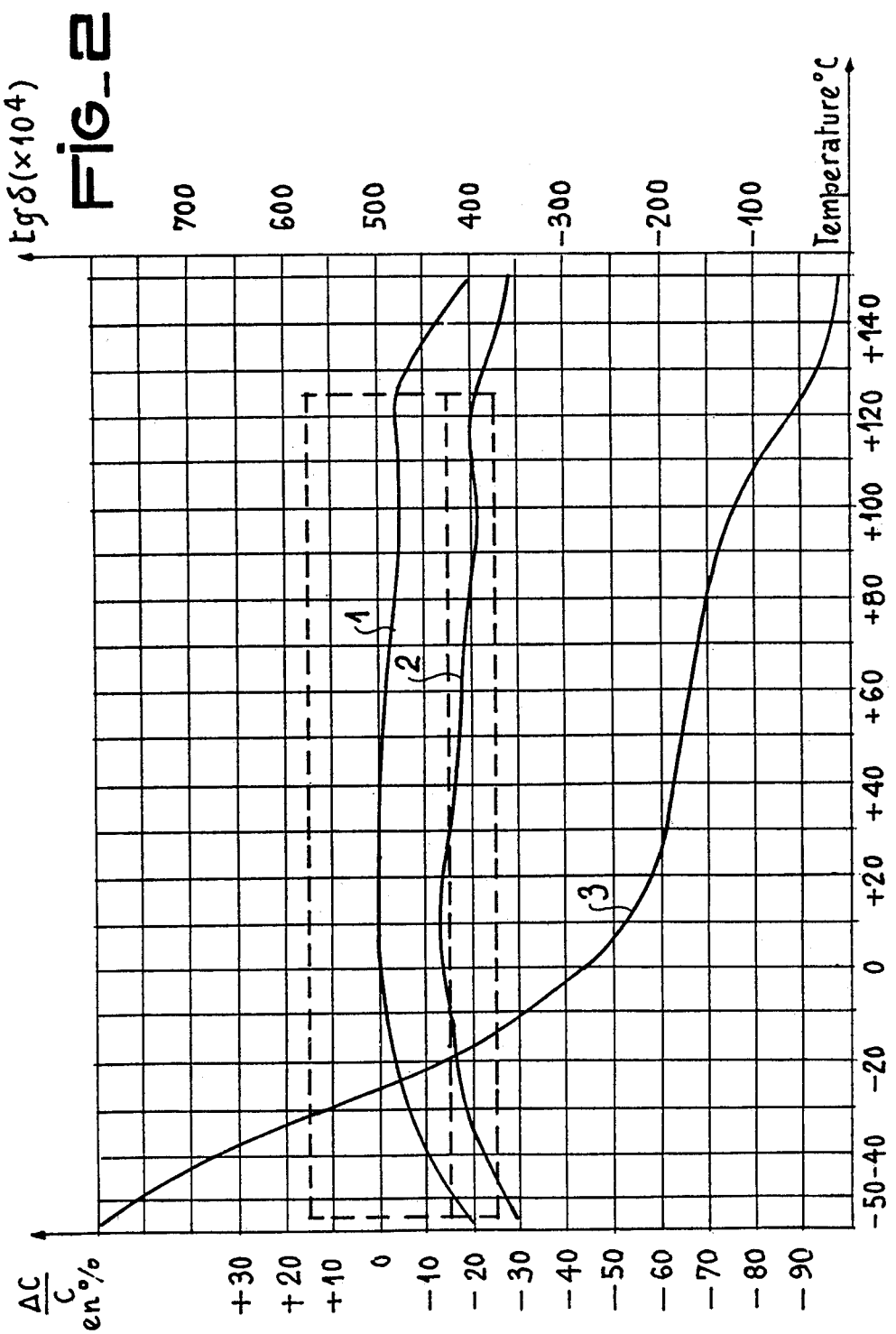

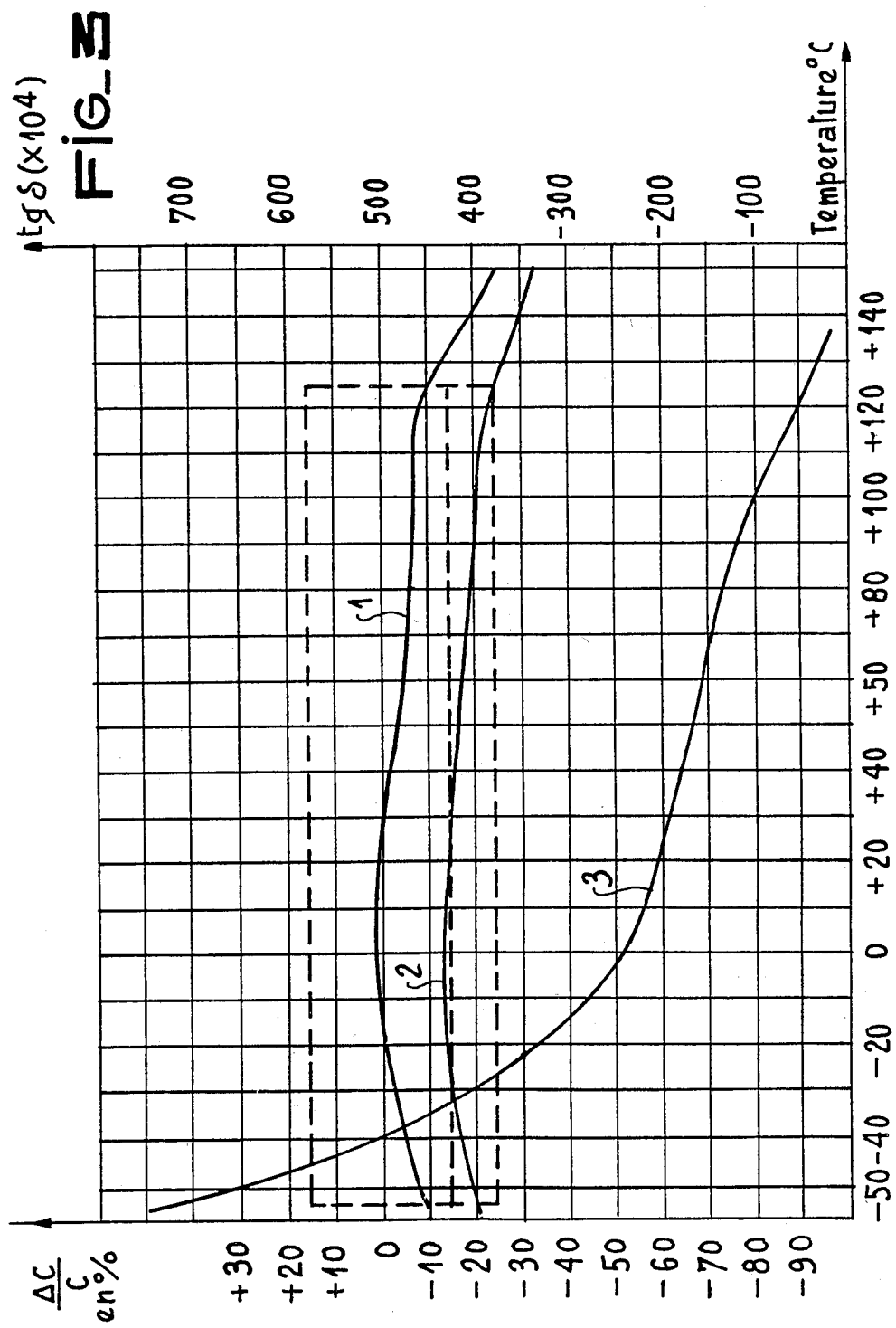

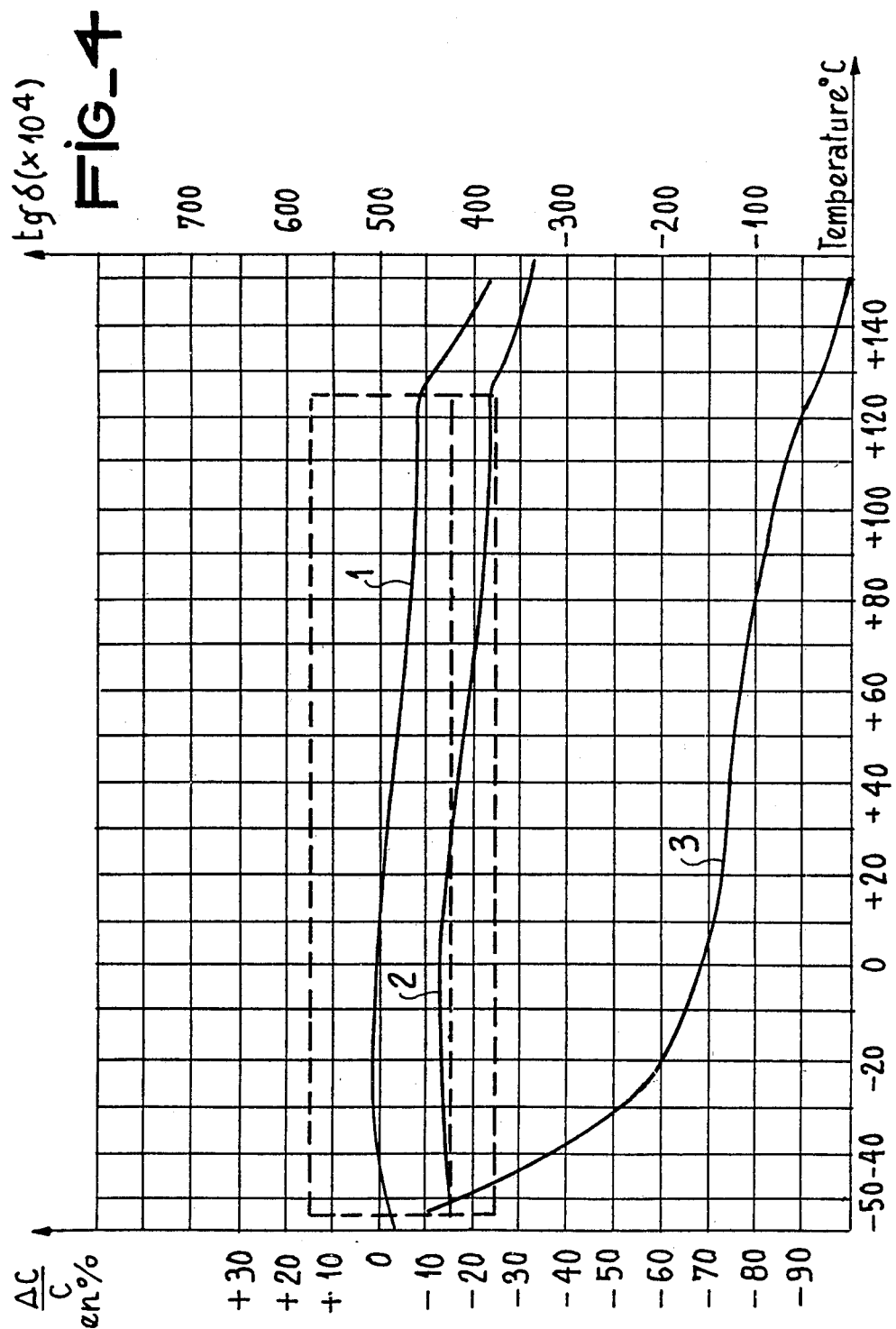

DIELECTRIC CERAMIC COMPOSITION ON THE BASE OF THERMALLY STABLE BARIUM TITANATE AND CAPACITOR USING SUCH COMPOSITION

BACKGROUND OF THE INVENTION

The present invention concerns a barium titanate based dielectric ceramic composition as well as a capacitor using this composition. It concerns, more particularly, a ceramic composition having a low relative variation of capacity within a wide temperature range, thus allowing said composition to reach class BX.

The article in the journal FERRO ELECTRICS, entitled "Electrode and materials problems in ceramic capacitors", by W. R. BUESSEM and T. I. PROKOROWICZ published in Volume 10—pages 225 to 230—1976 describes barium titanate compositions having a low sintering temperature using silver-palladium type electrodes that are far less expensive than electrodes made of gold or palladium. More especially, FIG. 6 of this article shows the results of measuring the relative variation of capacity with temperature for a dielectric having a constant equal to 1450. The variation curve under a voltage of 19.7 kV/cm, i.e. 2 volts/micron indeed corresponds to class BX, which means that the capacity variation of the said dielectric used in the form of a baked sheet of 25$\mu$ under 50 volts (nominal voltage) clearly meets the requirements of this class of products. However, the article points out simply that this composition is prepared on the base of barium titanate, glass and non specified additives. U.S. Pat. Nos. 3,619,220, 3,682,766 and 3,811,937, to which said article seems to refer with respect to the said compositions, show that the latter are prepared on the base of glass containing essentially cadmium oxide (about 33%) as well as bismuth oxide and lead oxide (25% by weight for each oxide). Among the possible additives to be used, it appears that neodymium oxide and lanthanum oxide are suitable.

However, as clearly demonstrated, by the article herein-above not all these compositions meet the requirements of class BX and those that do meet these requirements are not described therein. Furthermore, those compositions that meet the said requirements have a comparatively low dielectric constant.

The present invention is aimed at providing compositions that do not present this drawback, whilst having an excellent behaviour under varible temperature conditions in the absence as well as in the presence of an external electric field, so that some of said compositions will meet the requirements of class BX. (This class of components is defined especially by a relative variation of capacity $\Delta C/C$ between $-55°$ C. and $+125°$ C. lower than or equal to $\pm 15\%$ for a signal of IV at the frequency of 1 kHz and by a relative variation of capacity lower than $+15\%$ and $-25\%$ in the presence of an external direct electric field of about 50 volts. Precise definitions can be found in U.S. Standard MIL C 11015 D.

With this object in view the invention provides compositions comprising a mixture containing 80 to 94% by weight barium titanate, 1 to 3% by weight neodymium oxide, 0 to 4% bismuth oxide, 2 to 5% by weight bismuth titanate and 2 to 8% glass frit.

According to a preferred embodiment, the compositions according to the invention contain 1 to 4% by weight bismuth oxide.

As will be seen herein-under, it has been established that such compositions (known by those skilled in the art as "type III compositions"), not only have a lowered sintering temperature as compared to standard sintering temperatures of barium titanate based compositions, but that surprisingly the said compositions also have excellent electrical properties within a very wide temperature range.

Preferably, non stoechiometric barium titanate is used, having a $TiO_2/BaO$ molar ratio comprised between 1.06 and 1.09.

According to a preferred embodiment, the compositions according to the invention comprise more than 1.4% by weight, and preferably 1.4% to 2% by weight neodymium oxide. It has indeed been established that, surprisingly, under otherwise potential conditions, an amount of neodymium oxide higher than 1.4% by weight of the total composition allows compositions to be obtained which fully meet the specifications of Standard BX, more especially at low temperatures. But it has also been established that the increase in concentration of the neodymium oxide tends to amplify the relative variation of capacity at high temperatures.

The glass frit used within the scope of the present invention can have different compositions. The glass frit is obtained by a method well known per se, i.e. by mixing different ingredients used for producing glass, then melting these ingredients at high temperature, cooling to ambient temperature in order to obtain a glass that is thereafter ground into very fine particles, this powder being known as "glass frit". It has been established that it is necessary to use glass frit containing at least 70% by weight bismuth oxide, the other components being lead oxide and/or boron oxide. A fully satisfactory composition contains substantially 81% by weight bismuth oxide, 17% lead oxide and 2% boron oxide.

In order to further improve the electric properties and/or lower the sintering temperature of these components, up to 2% by weight of standard additives well known per se can be added. More especially, zinc oxide and/or manganese oxide can be added, as well as various mixtures thereof preferably in a proportion of about 0.5% by weight.

The invention also concerns multi-layer ceramic capacitors comprising electrodes containing 70% by weight silver, the 30% remaining being constituted by palladium. These capacitors are obtained according to the well known technique, comprising depositing electrodes by serigraphy on the dielectric layer and superimposing the layers thus produced, the even number electrodes and the odd number electrodes being respectively connected to each other, and the thus prepared assembly being then sintered at high temperature.

The invention will be explained in more detail in the following description of several embodiments, given by way of non-limitative illustration, and referring to the appended figures in which:

FIG. 1 shows a curve representing the relative capacity variation and the tangent of the angle of loss of the capacitor of Example 1.

FIG. 2 shows a curve representing the relative capacity variation and the tangent of the angle of loss of the capacitor of Example 2.

FIG. 3 shows a curve representing the relative capacity variation and the tangent of the angle of loss of the capacitor of Example 3.

FIG. 4 shows a curve representing the relative capacity variation and the tangent of the angle of loss of the capacitor of Example 4.

EXAMPLE 1

In a jar made of porcelain containing 7 kg of zirconium balls, 2 litres of solvent, 200 g of methylpolymethacrylate and 2 kg of powder having the following composition:

| | |
|---|---|
| $BaTiO_3$ | 90.03 |
| Neodymium oxide $Nd_2O_2$ | 1.12 |
| Manganese oxide MnO | 0.21 |
| Bismuth titanate $Bi_2O_3$, $2TiO_2$ | 2.80 |
| Glass frit (constituted by 81% by weight $Bi_2O_3$, 17% PbO, 2% $B_3O_3$) | 4.01 |
| $Bi_2O_3$ | 1.83 |
| Stoechiometric ratio of $BaTiO_3$: $TiO_2/BaO = 1.08$ | |

(All the percentages given above are percentages by weight).

All these constituents are mixed during about 15 hours. The barbotine then obtained is poured on to a rigid and smooth support, then dried. By using the resulting ceramic sheet, it is possible to produce multilayer conductors constituted by a stack of alternately arranged ceramic dielectric layers and metallic electrodes. These are deposited on the dielectrics according to the well known serigraphy technique. They are constituted by a palladium-silver alloy comprising 70% by weight silver. The capacitors thus produced comprise 21 metallized layers acting as armatures or coatings, the even number layers and the uneven number layers being respectively connected to each another. These capacitors are thereafter sintered at a temperature of 1130° C. in air. Each ceramic layer has a thickness of about 27 microns. The results obtained are set out in Table I:

TABLE I

| | |
|---|---|
| Capacity | 144 nF |
| Tangent $\delta \times 10^{+4}$ (under voltage 1 Volt at 1 kHz) | 200 |
| Insulation resistance at 63 Volts | 93 GΩ |
| Relative variation of capacity $\Delta C/C$ between 0 and 1 Volt per micron | −1.4% |
| Dielectric constant at 20° C. | 2350 |
| Natural aging coefficient at 20° C. | −0.4%/decade |
| Dimensions of the ceramic block | 1.1 × 3.4 × 4.7 mm |

In Table I herein-under, it has been established that the dielectric according to the invention, as well as the condensors produced from this dielectric possess a high constant and very good thermal stability.

The detailed measurement results of the relative capacity variation $\Delta C/C$ are given in FIG. 1 in terms of temperature. In abscissae, the temperatures are raised from −55° C. and 125° C., whereas in ordinates, the relative capacity variation $\Delta C/C$ are given as a percentage. Curve 1 shows the relative capacity variations of the capacitors of Example 1 at an effective volt at 1 kHz. The nominal value of the capacity was taken for 25° C., which corresponds at this temperature to $\Delta C/C$ equal to 0.

Curve 2 shows the relative capacity variation $\Delta C/C$ in the presence of a direct electric field having a polarization of 63 Volts, measured by using a 1 Volt signal having a frequency of 1 kHz. In this example, the results are excellent, since the effect of the direct voltage is relatively small with respect to the high value of the dielectric constant.

FIG. 1 also shows curve 3 that represents the variation of the tangent of the angle of loss, tangent δ in terms of temperature. The instructions for interpretation of this curve are indicated to the right of the figure. This curve indicates the general tendency of variation of this angle of loss.

This composition, as can be observed from FIG. 1, is not very different from standard BX since at a voltage of 0 Volt, the standard is respected, whereas at a direct voltage of 63 Volts (and not 50 volts as specified in this standard), $\Delta C/C$ is at −55° C. slightly too strong.

EXAMPLE 2

In the same conditions as those indicated in Example 1 a mixture is prepared also containing 2 kg of a powder, the proportions of which are given below:

| | |
|---|---|
| Barium titanate $BaTiO_3$ | 88.75 |
| Neodymium oxide | 1.37 |
| Manganese oxide | 0.23 |
| Zinc oxide | 0.23 |
| Bismuth titanate | 3.05 |
| Bismuth oxide | 1.99 |
| Glass frit (having the same composition as that of Example 1) | 4.37 |
| Stoechiometric ratio of $BaTiO_3$: $TiO_2/BaO = 1.08$ | |

Multi-layer ceramic capacitors are produced as described in Example 1 in the same conditions, but sintered at a temperature of 1168° C. The results obtained have been compiled in Table II herein-below:

TABLE II

| | |
|---|---|
| Capacity | 114 nF |
| Tangent $\delta \times 10^{+4}$ (at 1 Volt at 1 kHz) | 200 |
| Insulation resistance at 63 Volts | 160 GΩ |
| Relative variation of capacity between 0 and 1 Volt per micron | −1.8% |
| Dielectric constant at 20° C. | 2275 |
| Aging coefficient at 20° C. | 0.4%/decade |
| Number of metallized layers (Pd-Ag 30–70) | 34 |
| Dimensions of the ceramic block | 0.94 × 2.5 × 3.2 mm |

Curves representing the relative capacity variation with temperature are shown in FIG. 2. In FIG. 2 the notations in abscissae and instructions and the meanings of the different curves are identical to those of the corresponding case in Example 1.

Curve 2 of FIG. 2 that corresponds to curve 2 of FIG. 1 also shows the excellent thermal stability of the capacity at nominal voltage.

Curve 3 that corresponds to curve 3 of FIG. 1 shows the variation of the tangent of the angle of loss, with temperature.

EXAMPLE 3

In the same conditions as those indicated in Example 1, a mixture is prepared containing 2 kg of a powder, of which the proportions are given herein-below:

| | |
|---|---|
| Barium titanate $BaTiO_3$ | 88.30 |
| Neodymium oxide | 1.52 |
| Manganese oxide | 0.23 |
| Zinc oxide | 0.23 |

-continued

| | |
|---|---|
| Bismuth titanate | 3.03 |
| Bismuth oxide | 1.98 |
| Glass frit (identical to Example 1) | 4.70 |
| Stoechiometric ratio of BaTiO$_3$: TiO$_2$/BaO = 1.08 | |

Multi-layer ceramic capacitors are produced as in Example 1, and the results of the measurements obtained are the following in Table III:

TABLE III

| | |
|---|---|
| Capacity | 66 nF |
| Tangent δ × 10$^{-4}$ (at 1 Volt at 1 kHz) | 200 |
| Insulation resistance at 63 Volts | 300 GΩ |
| Relative variation of capacity between 0 and 1 Volt per micron | −2% |
| Dielectric constant at 20° C. | 2000 |
| Natural aging coefficient at 20° C. | −0.5%/decade |
| Number of metallized layers (Pd-Ag 30–70) | 21 |
| Dimensions ceramic block | 0.8 × 2.5 × 3.2 mm |
| Temperature class (standard MIL C 11015 D) | BX |

In this example, the thermal stability of the capacity, is improved, whereas the insulation resistance at 63 Volts is clearly higher.

In capacitors produced according to this example, the same measurements as those in Examples 1 and 2 where taken, measurements represented in FIG. 3, on which curves 1, 2 and 3 have the same meanings as on the preceding figures.

EXAMPLE 4

In the same conditions as those indicated in Example 1, a mixture is prepared also containing 2 kg of a powder, of which the proportions are shown herein-below:

| | |
|---|---|
| Barium titanate | 88.96 |
| Neodymium oxide | 1.88 |
| Manganese oxide | 0.23 |
| Bismuth titanate | 2.55 |
| Bismuth oxide | 2.00 |
| Glass frit (identical composition to preceding examples) | 4.38 |
| Stoechiometric ratio of BaTiO$_3$: TiO$_2$/BaO = 1.08 | |

Multi-layer ceramic capacitors are obtained in the conditions indicated in Table IV and their results hve been compiled in the same Table:

TABLE IV

| | |
|---|---|
| Capacity | 922 nF |
| Tangent δ × 10$^{-4}$ (1 volt - 120 kHz) | 200 |
| Insulation resistance at 63 Volts | 30 GΩ |
| Relative variation capacity between 0 and 1 Volt per micron | −1.8% |
| Dielectric constant at 20° C. | 2270 |
| Natural aging coefficient at 20° C. | −0.4%/decade |
| Number of metallized layers (Pd-Ag 30–70) | 48 |
| Dimensions of the ceramic block | 5.4 × 6.3 × 1.5 mm |
| Temperature class (standard MIL C 11015 D) | BX |

Curves representing the relative capacity variation with temperature are shown in FIG. 4 both with and without applied voltage (63 V). Excellent thermal stability of the capacitor within a very wide interval (−55° to +125° C.) is observed, considering the very high value of the dielectric constant of the material (2270).

The examples given herein-above, along with the corresponding curves thus demonstrate clearly unexpected and surprising results of ceramic compositions according to the invention, especially when the said compositions are used to produce multi-layer ceramic capacitors. The compositions of Examples 3 and 4 allow multi-layer ceramic capacitors of class BX to be obtained.

The invention is not limited to the embodiments shown in the appended Figures and described herein-above. Many modifications and variants may be envisaged by those skilled in the art without departing from the spirit and scope of the invention as defined in the appended claims.

What is claimed is:

1. A ceramic capacitor comprising at least one dielectric layer and at least two electrodes, each pair of said electrodes being separated by said dielectric layer, wherein said dielectric layer comprised from 80 to 94% by weight of barium titanate, from 1 to 3% by weight of neodymium oxide, from 0 to 4% bismuth oxide, from 2 to 5% by weight of bismuth titanate (Bi$_2$O$_3$2TiO$_2$) and from 2 to 8% by weight of glass frit, the whole having been selected so as to form 100% by weight.

2. A ceramic capacitor according to claim 1, comprising more than 1.4% by weight of neodymium oxide.

3. A ceramic capacitor according to claim 1, comprising 1.4% to 2% by weight of neodymium oxide.

4. A ceramic capacitor according to claim 1, comprising from 1 to 4% by weight of bismuth oxide.

5. A ceramic capacitor according to claim 1, wherein the barium titanate comprises a TiO$_2$/BaO molar ratio comprised between 1.06 and 1.09.

6. A ceramic capacitor according to claim 1, wherein the glass frit comprises more than 70% by weight of bismuth oxide.

7. A ceramic capacitor according to claim 6, wherein it comprises substantially 81% by weight of bismuth oxide, 17% by weight of lead oxide, and 2% by weight of boron oxide.

8. A ceramic capacitor according to claim 1, further comprising less than to 2% of additives.

9. A ceramic capacitor according to claim 8, wherein it comprises about 0.5% by weight of additives.

10. A ceramic capacitor according to claim 8, wherein the additives are selected among the group comprising zinc oxides, manganese oxides and their mixture.

11. A ceramic capacitor according to claim 10, wherein it comprises about 0.25% by weight of manganese oxide.

12. Electric capacitor according to claim 1, comprising a plurality of metallic electrodes separated by dielectric layers, the even number metallic electrodes rows and the odd number metallic electrodes rows being, respectively, connected to each other, wherein the said electrodes are constituted by a mixture of palladium and silver comprising at least 70% by weight silver.

* * * * *